United States Patent
Burke

(10) Patent No.: US 10,794,434 B2
(45) Date of Patent: Oct. 6, 2020

(54) SPLIT RACE FOR WEDGE CLUTCH BEARING ASSEMBLY

(71) Applicant: Schaeffler Technologies AG & Co. KG, Herzogenaurach (DE)

(72) Inventor: Peter Burke, Charlotte, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 170 days.

(21) Appl. No.: 15/985,941

(22) Filed: May 22, 2018

(65) Prior Publication Data

US 2019/0360537 A1   Nov. 28, 2019

(51) Int. Cl.
F16D 41/063 (2006.01)
F16C 19/06 (2006.01)
F16C 41/00 (2006.01)

(52) U.S. Cl.
CPC ........... *F16D 41/063* (2013.01); *F16C 19/06* (2013.01); *F16C 41/001* (2013.01); *F16C 2361/43* (2013.01)

(58) Field of Classification Search
None
See application file for complete search history.

(56) References Cited

U.S. PATENT DOCUMENTS

| 1,928,191 | A | * | 9/1933 | Van Meurs | F16D 41/22 |
| | | | | | 192/70.15 |
| 4,770,054 | A | * | 9/1988 | Ha | F16H 57/12 |
| | | | | | 74/409 |
| 5,078,243 | A | | 1/1992 | Kanai et al. | |
| 5,086,898 | A | * | 2/1992 | Patton | F16D 43/213 |
| | | | | | 192/107 C |
| 5,597,057 | A | * | 1/1997 | Ruth | F16D 41/12 |
| | | | | | 188/82.8 |
| 6,065,576 | A | * | 5/2000 | Shaw | F16D 41/125 |
| | | | | | 192/45.1 |
| 6,279,708 | B1 | | 8/2001 | Yatabe et al. | |
| 7,832,542 | B2 | * | 11/2010 | Byun | F16D 41/066 |
| | | | | | 192/223.2 |
| 9,732,808 | B2 | * | 8/2017 | Davis | F16D 15/00 |
| 2014/0014455 | A1 | | 1/2014 | Davis | |
| 2015/0323018 | A1 | | 11/2015 | Hemphill et al. | |

FOREIGN PATENT DOCUMENTS

| DE | 102014201117 A1 | 7/2015 |
| DE | 10 2016 222 443 B3 | 1/2018 |
| JP | 2014-077510 A | 5/2014 |

* cited by examiner

*Primary Examiner* — Colby M Hansen
(74) *Attorney, Agent, or Firm* — Volpe and Koenig, P.C.

(57) ABSTRACT

An outer ring assembly adapted for a one way clutch bearing assembly is provided. The outer ring assembly includes two separately formed rings. A first outer ring includes a groove adapted to receive a plurality of locking wedges, and a second outer ring includes an outer race adapted to support a plurality of rolling elements. The outer ring assembly is installed with a one way clutch bearing assembly including an inner ring defining both an inner race adapted to support rolling elements, and a plurality of ramps axially spaced from the inner race.

13 Claims, 8 Drawing Sheets

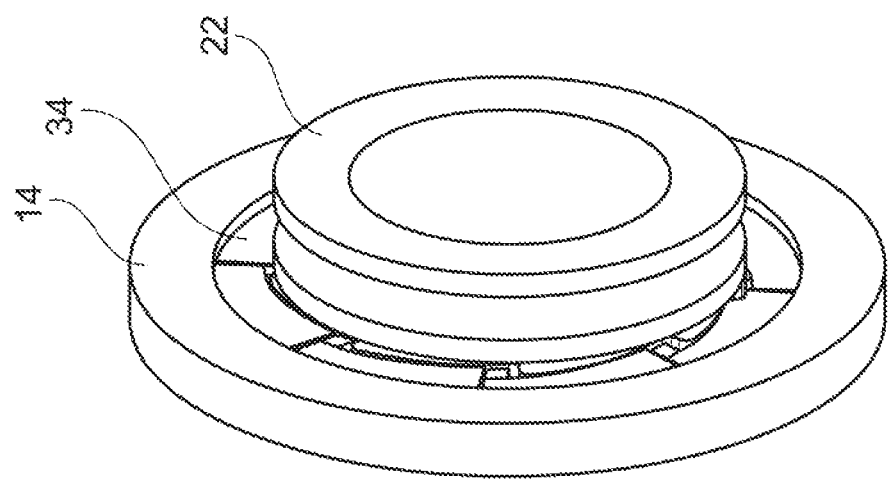
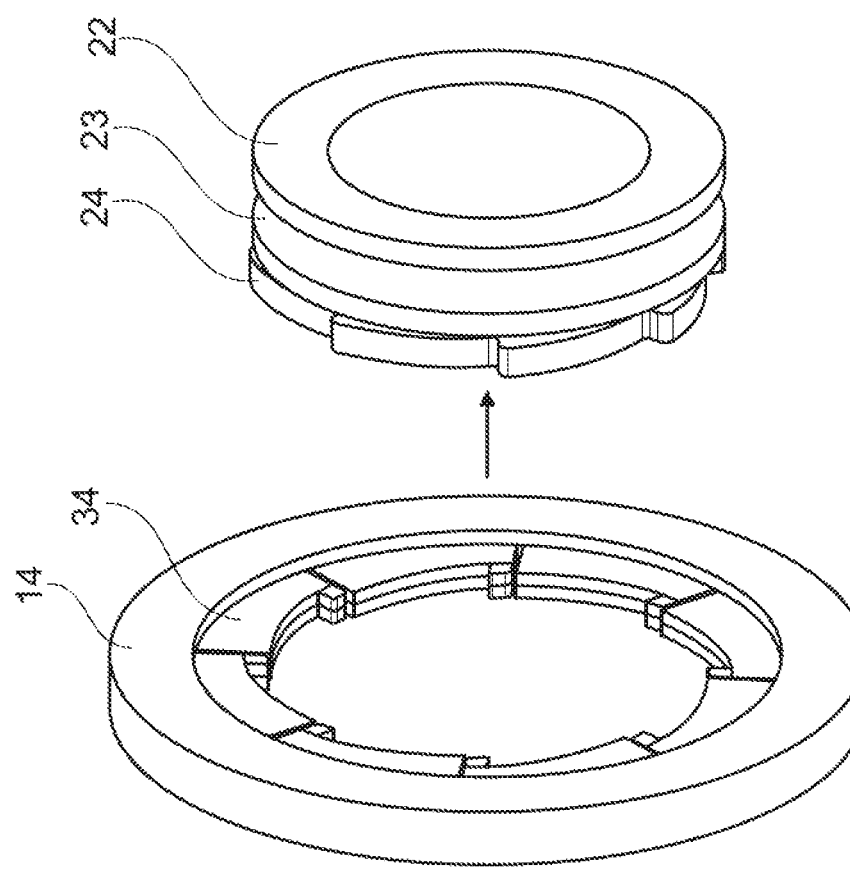

SPLIT RACE FOR WEDGE CLUTCH BEARING ASSEMBLY

FIELD OF INVENTION

The present invention relates to a wedge clutch bearing assembly, and more particularly relates to a split race for a one way wedge clutch bearing assembly.

BACKGROUND

One way clutch bearings are well known. There is an increasing need for axial space as mechanical systems become more complex and consumers demand more compact arrangements. Accordingly, compact one way clutch arrangements are becoming more desirable. One way clutches typically include ramps formed on a first ring and wedges that ride along the ramps to lock the wedges with a corresponding groove formed on a second ring.

To assemble a one way clutch, the wedges are loaded into the ring including the groove, and the ring including the ramps is then inserted relative to the ring including the groove and the wedges. This type of assembly requires both rings to be concentric to each other, i.e. on-axis.

In contrast, assembling a rolling element bearing arrangement requires the outer ring to first be loaded with the rolling elements, and then insertion of the inner ring within the outer ring. During this assembly, the inner ring must be off-axis from the outer ring during this insertion.

Based on the combination of requiring both one set of on-axis components and one set of off-axis components, assembling a one way clutch bearing assembly is impossible for a single piece outer ring and a single piece inner ring.

SUMMARY

An outer ring assembly adapted for a one way clutch bearing assembly is provided. The outer ring assembly includes two separately formed rings. A first outer ring includes a groove adapted to receive a plurality of locking wedges, and a second outer ring includes an outer race adapted to support a plurality of rolling elements. The outer ring assembly is installed with a one way clutch bearing assembly including an inner ring defining both an inner race adapted to support rolling elements, and a plurality of ramps axially spaced from the inner race.

In one embodiment, a method of assembling a one way clutch bearing assembly is provided. The method includes providing a split outer ring assembly comprising a first outer ring including a groove adapted to receive a plurality of locking wedges, and a second outer ring including an outer race adapted to support a plurality of rolling elements. The method includes providing an inner ring including an inner race adapted to support rolling elements, and a plurality of ramps axially spaced from the inner race; a plurality of locking wedges; and a plurality of rolling elements. The method includes positioning the plurality of locking wedges within the groove of the first outer ring; and positioning the plurality of rolling elements on the outer race of the second outer ring. The method includes performing a first one of: (i) aligning the plurality of locking wedges with the plurality of ramps and inserting the inner ring inside the first outer ring supporting the plurality of locking wedges; or (ii) inserting the inner ring inside the second outer ring supporting the plurality of rolling elements. The method then includes performing a second one of (i) aligning the plurality of locking wedges with the plurality of ramps and inserting the inner ring inside the first outer ring supporting the plurality of locking wedges; or (ii) inserting the inner ring inside the second outer ring supporting the plurality of rolling elements.

BRIEF DESCRIPTION OF THE DRAWINGS

The foregoing Summary and the following detailed description will be better understood when read in conjunction with the appended drawings, which illustrate a preferred embodiment of the invention. In the drawings:

FIGS. 6A-6F illustrate assembly steps for assembling the clutch bearing assembly of FIG. 1.

DETAILED DESCRIPTION OF THE PREFERRED EMBODIMENTS

Figure 1:
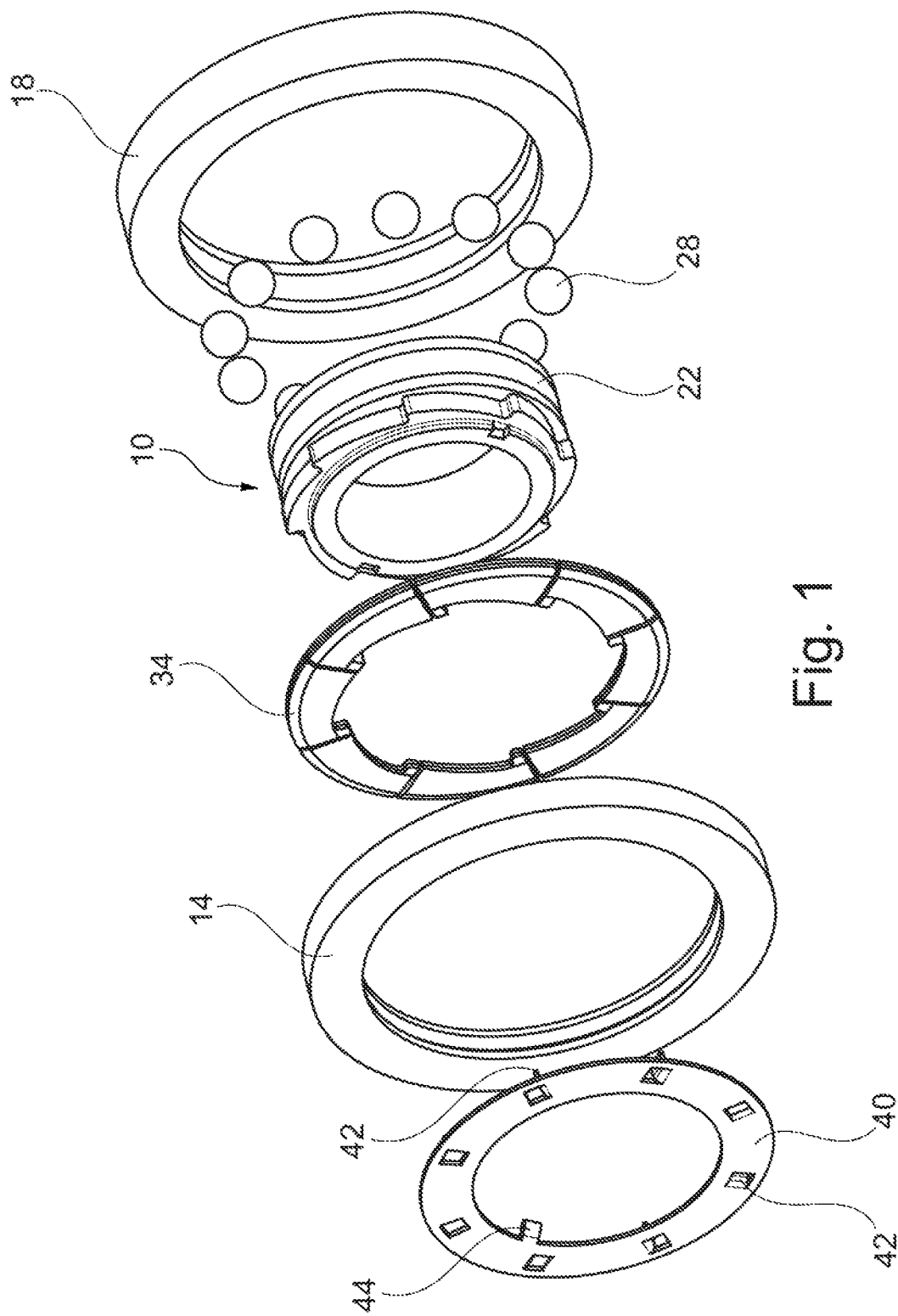
FIG. 1 is a perspective exploded view of a clutch bearing assembly according to one embodiment.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Referring to FIGS. 1-6F, a clutch bearing assembly 10 is illustrated. FIG. 1 illustrates all of the components of the clutch bearing assembly 10 in an exploded view. The clutch assembly 10 is a one way clutch assembly. The clutch assembly 10 includes a split outer ring assembly 12 comprised of a first outer ring 14 with a groove 15 adapted to receive a plurality of locking wedges 34, and a second outer ring 18 including an outer race 19 adapted to support a plurality of rolling elements 28.

The first outer ring 14 and the second outer ring 18 are fixed to each other. In one embodiment, the first outer ring 14 is fixed to the second outer ring 18 via an interference fit. In one embodiment, the first outer ring 14 is fixed to the second outer ring 18 via a press fit. One of ordinary skill in the art would understand that alternative configurations for fixing the rings 14, 18 to each other can be used based on this disclosure.

Figure 5:
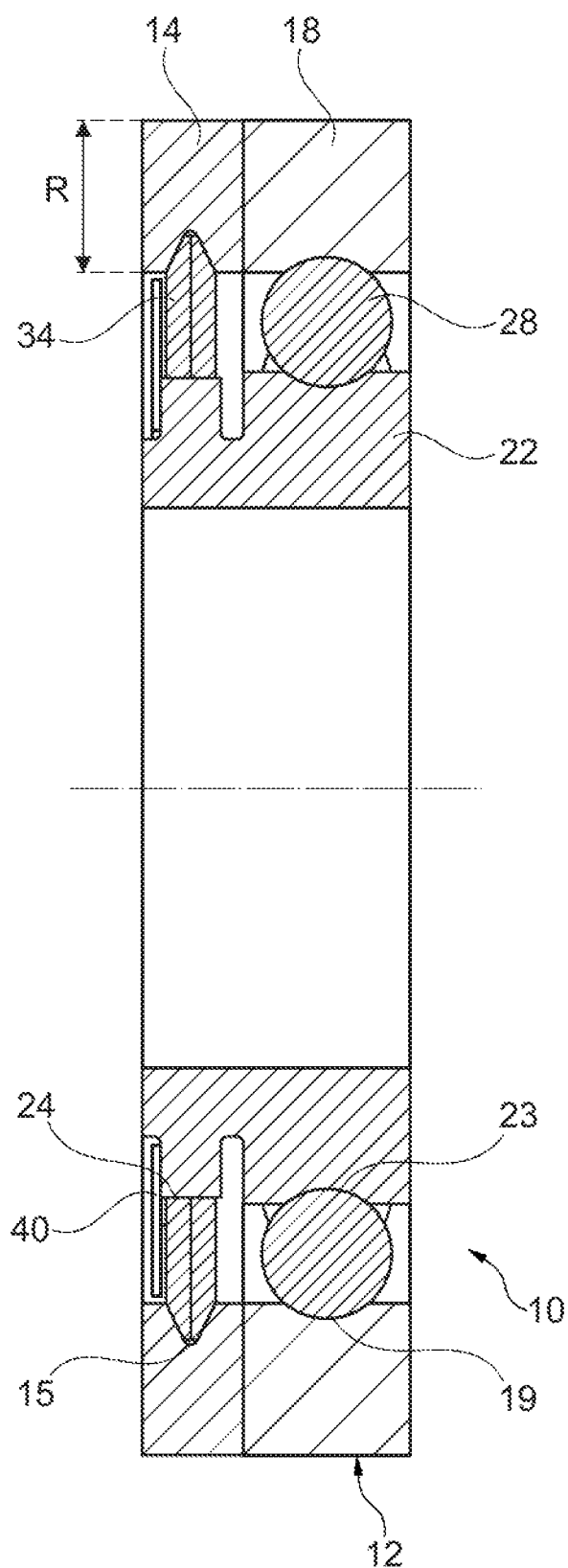
FIG. 5 is a cross sectional view of the clutch bearing assembly of FIG. 1.

As shown in FIG. 5, the first outer ring 14 and the second outer ring 18 have an identical radial height (R). One of ordinary skill in the art would understand from the present disclosure that the geometries of the rings 14, 18 can be varied depending on a specific application.

The clutch assembly 10 includes an inner ring 22 including an inner race 23 adapted to support rolling elements 28, and a plurality of ramps 24 axially spaced from the inner race 23. The inner ring 22 is a unitary ring.

Figure 4:
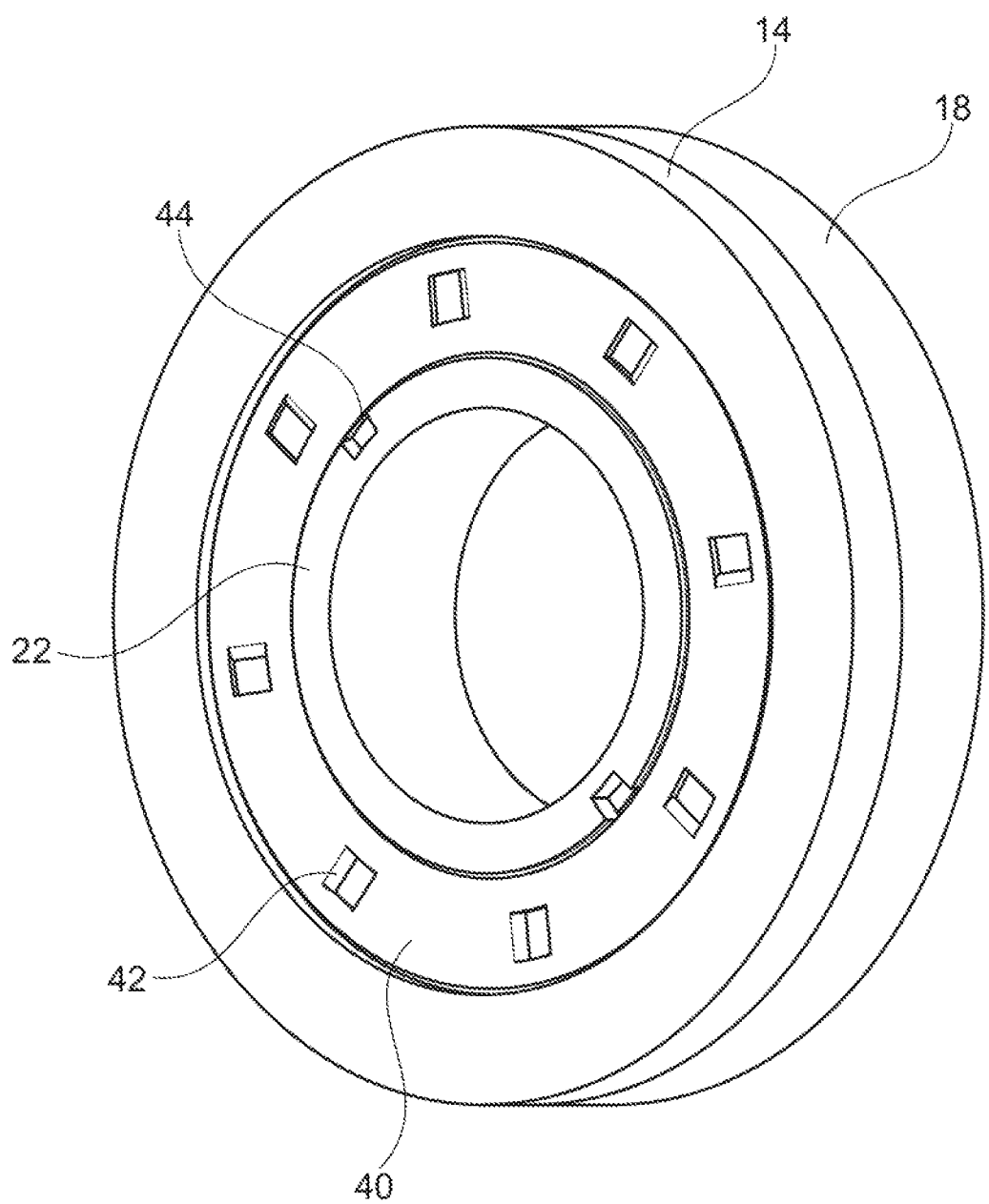
FIG. 4 is a perspective view of one side of the clutch bearing assembly of FIG. 1.

As shown in FIGS. 1 and 4, a cage 40 is provided that includes a plurality of axially extending biasing prongs 42. The cage 40 can include an additional prong 44 adapted to engage a corresponding groove on the inner ring 22.

Figure 2:
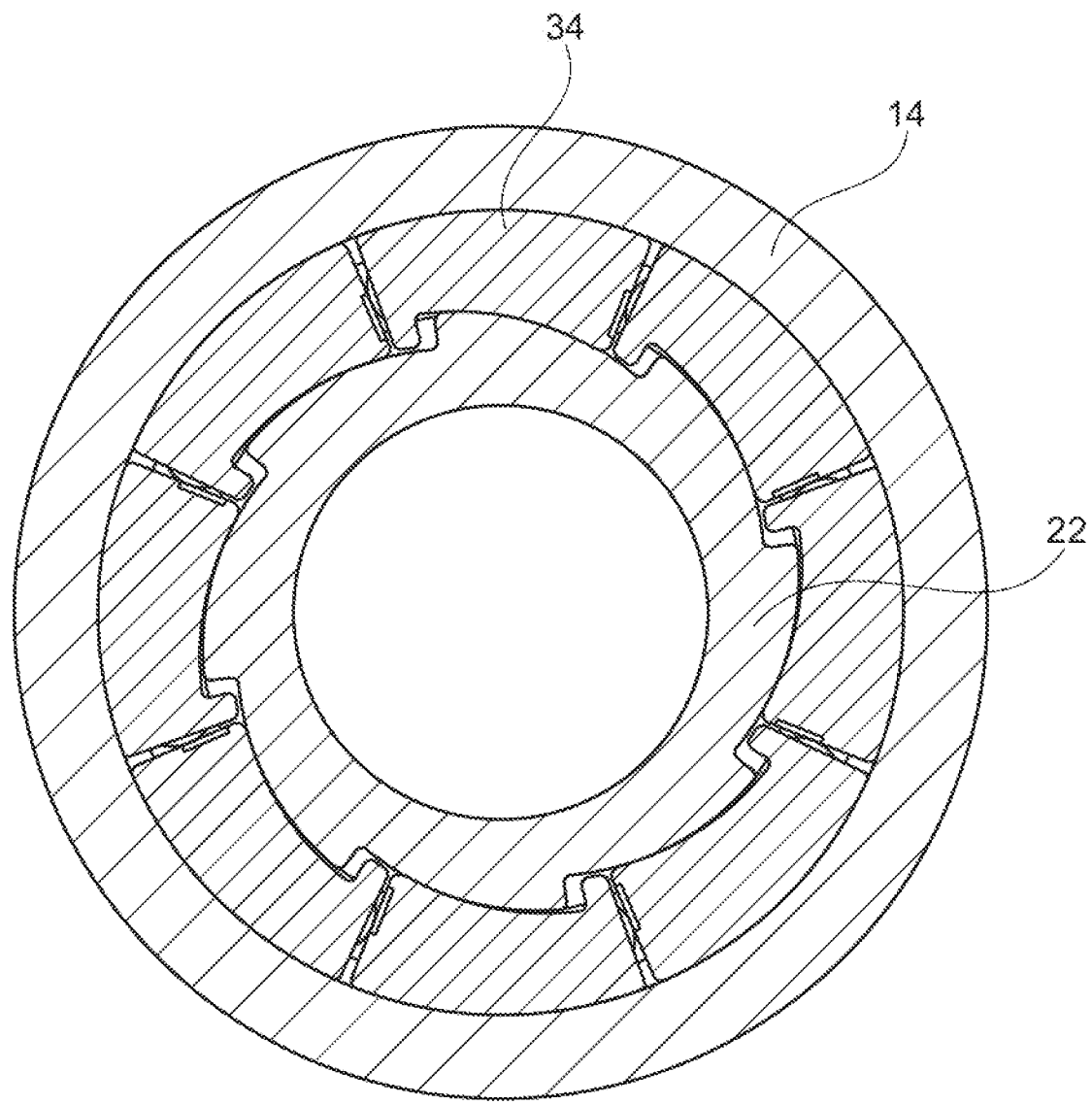
FIG. 2 is a cross sectional view of the inner ring, locking wedges, and a first outer ring of the clutch bearing assembly of FIG. 1.

As shown in FIGS. 1 and 2, the assembly includes a plurality of locking wedges 34 arranged radially between the groove 15 of the first outer ring 14 and the plurality of ramps 24, and each locking wedge of the plurality of locking wedges 34 is arranged circumferentially between a respective pair of the plurality of axially extending biasing prongs 42. As shown in FIG. 5, the groove 15 of the first outer ring 14 includes a tapered profile.

Figure 3:
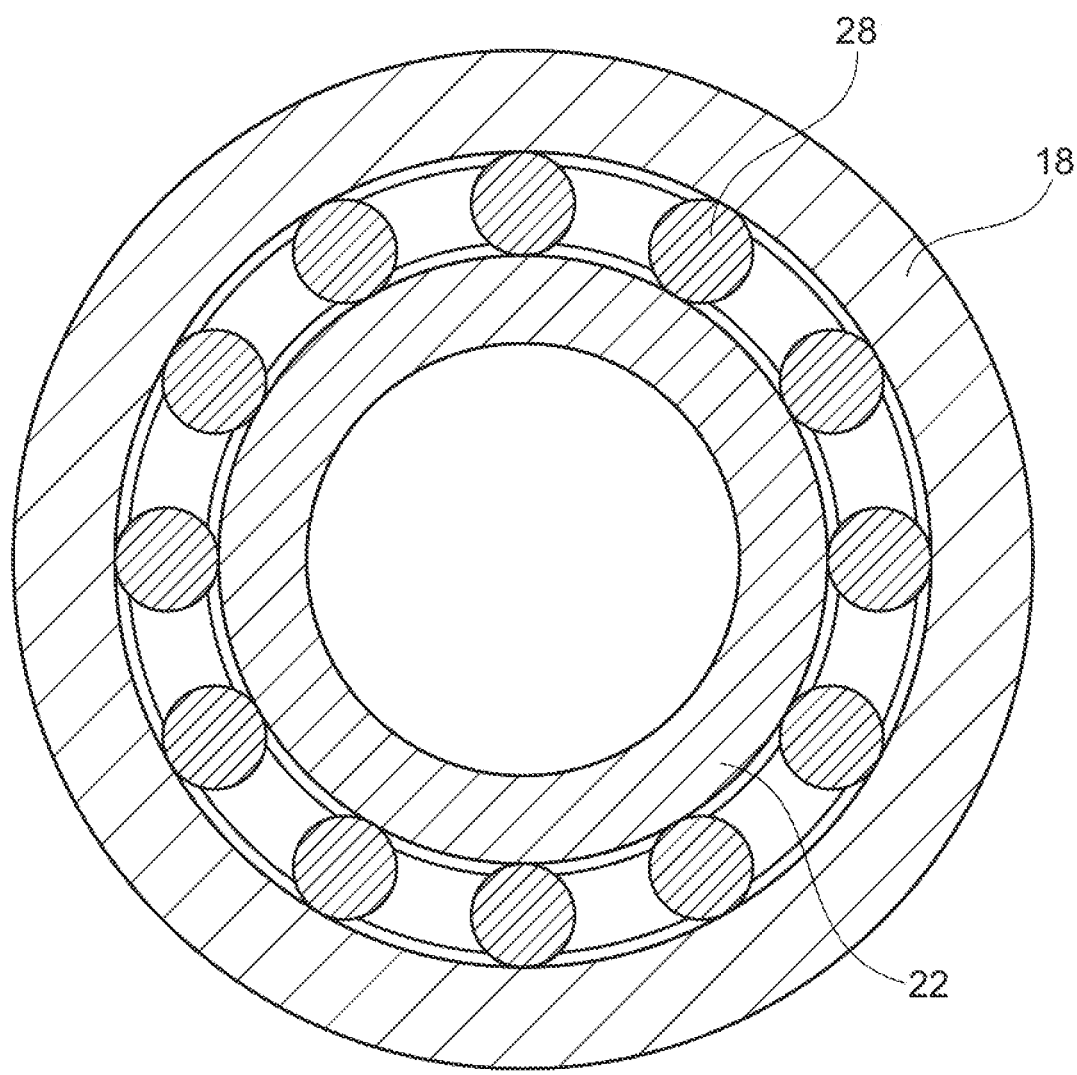
FIG. 3 is a cross sectional view of the inner ring, rolling elements, and a second outer ring of the clutch bearing assembly of FIG. 1.

As shown in FIGS. 1 and 3, a plurality of rolling elements 28 are supported between the inner race 23 of the inner ring 22 and the outer race 19 of the second outer ring 18. As shown in the drawings, the rolling elements 28 are spherical ball bearings. One of ordinary skill in the art would understand that alternative types of rolling elements can be used.

Figure 6D:
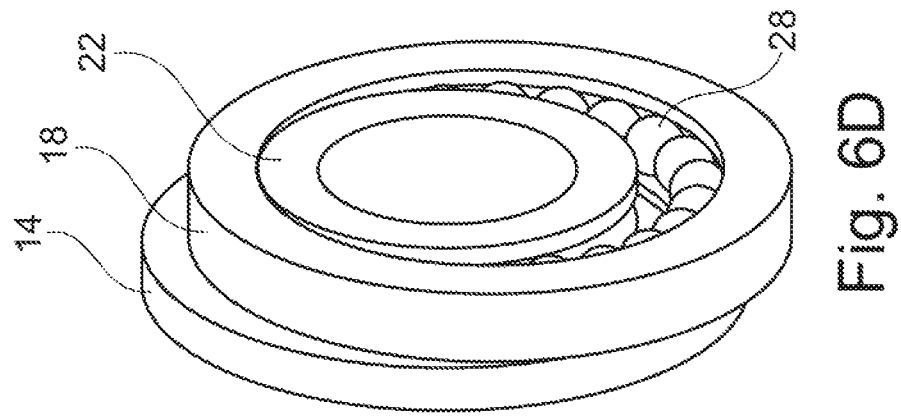

In one embodiment, a method of assembling a one way clutch bearing assembly 10 is provided. FIGS. 6A-6E show varying steps of assembling the one way clutch bearing assembly 10, and FIG. 6F illustrates the fully assembled one way clutch bearing assembly 10.

The method comprises providing: a split outer ring assembly 12 comprising a first outer ring 14 including a groove 15 adapted to receive a plurality of locking wedges 34, and a second outer ring 18 including an outer race 19 adapted to support a plurality of rolling elements 28. The method includes providing an inner ring 22 including an inner race 23 adapted to support rolling elements 28, and a plurality of ramps 24 axially spaced from the inner race 23. The method includes providing a plurality of locking wedges 34 and a plurality of rolling elements 28.

As shown by the left side of FIG. 6A, the method includes positioning the plurality of locking wedges 34 within the groove 15 of the first outer ring 14. As shown by the right side of FIG. 6C, the method includes positioning the plurality of rolling elements 28 on the outer race 19 of the second outer ring 18.

The method includes performing a first one of: (i) aligning the plurality of locking wedges 34 with the plurality of ramps 24 and inserting the inner ring 22 inside the first outer ring 14 supporting the plurality of locking wedges 34 (FIG. 6A); or (ii) inserting the inner ring 22 inside the second outer ring 18 supporting the plurality of rolling elements 28 (FIG. 6C).

Figure 6C:
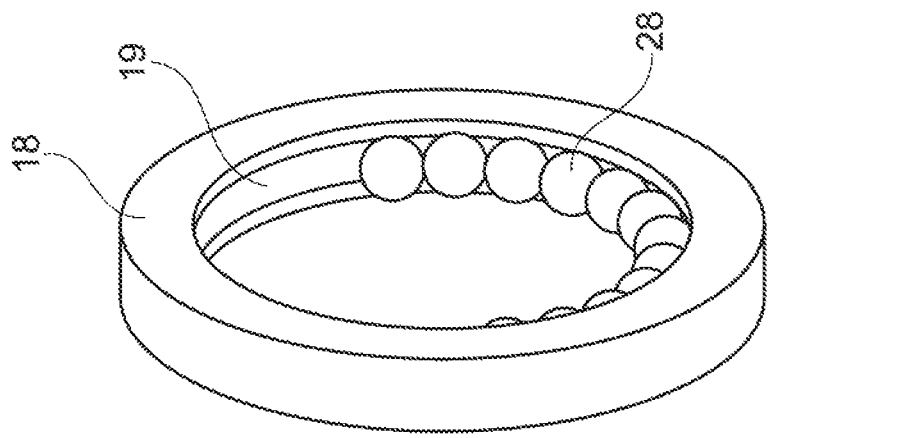
Figure 6C:
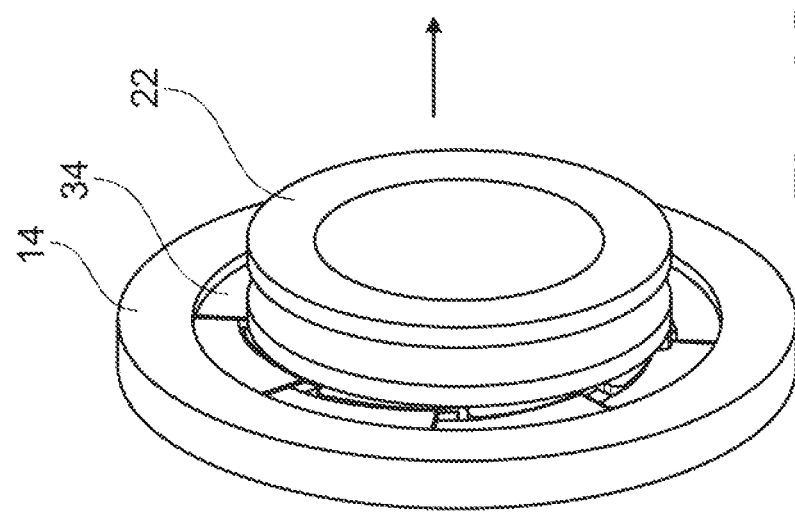
Figure 6F:
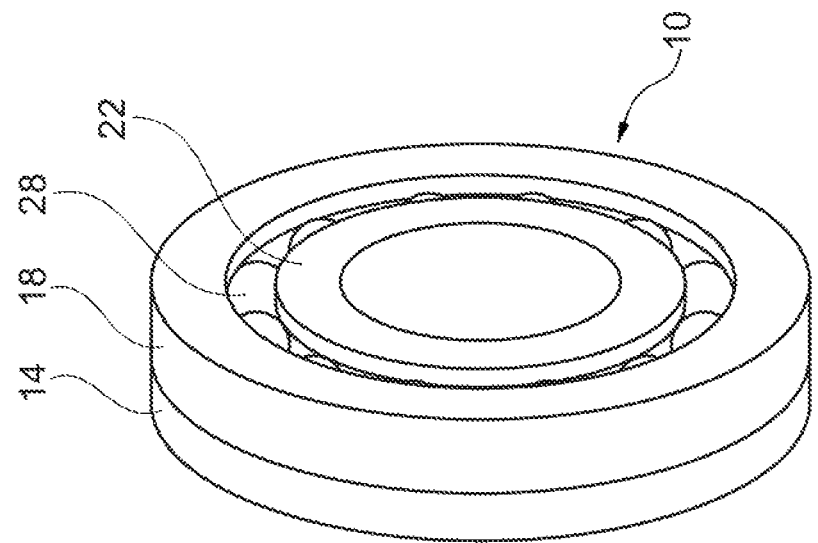

The method includes performing a second one of (i) aligning the plurality of locking wedges 34 with the plurality of ramps 24 and inserting the inner ring 22 inside the first outer ring 14 supporting the plurality of locking wedges 34 (FIG. 6A); or (ii) inserting the inner ring 22 inside the second outer ring 18 supporting the plurality of rolling elements 28 (FIG. 6C).

FIG. 6B illustrates the inner ring 22 fully inserted within the first outer ring 14. As shown in FIGS. 6A and 6B, the inner ring 22 and the first outer ring 14 are concentric, i.e. on axis, with respect to each other during this insertion step.

As shown in FIGS. 6C and 6D, insertion of the inner ring 22 into the second outer ring 18 requires the inner ring 22 to be off-axis relative to the second outer ring 18, i.e. an axis of the inner ring 22 is radially offset from an axis of the second outer ring 18. Although the first outer ring 14 is shown as already inserted around the inner ring 22 in FIGS. 6C and 6D, one of ordinary skill in the art would understand from the present disclosure that the inner ring 22 can be inserted into the second outer ring 18 without the first outer ring 14 already installed around the inner ring 22.

Figure 6E:
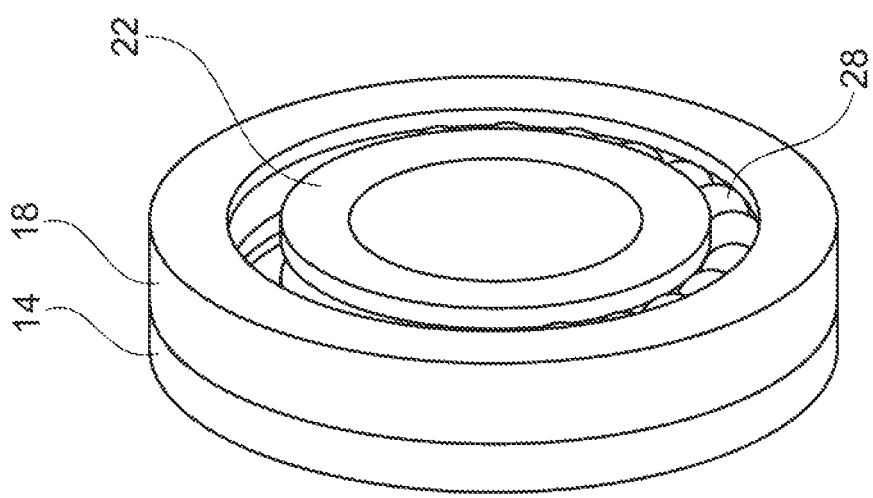

As shown in FIG. 6D, the second outer ring 18 is offset from the inner ring 22, which is required to allow the rolling elements 28 to clear the inner ring 22. FIG. 6E illustrates a step immediately following FIG. 6D, in which the second outer ring 18 is positioned concentric about the inner ring 22, and the rolling elements 28 can be circumferentially spaced around the outer race 19 and the inner race 23.

FIG. 6F illustrates the fully assembled one way clutch bearing assembly 10. One of ordinary skill in the art would understand that the steps illustrated in FIGS. 6A-6E can be performed in different sequences, and with additional components or without components illustrated in specific drawings. For example, the order of the inner ring 22 being inserted into the first outer ring 14 and the second outer ring 22 can be changed.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

LOG OF REFERENCE NUMERALS clutch bearing assembly 10
outer ring assembly 12
first outer ring 14
groove 15
second outer ring 18
outer race 19
inner ring 22
inner race 23
plurality of ramps 24
rolling elements 28
plurality of locking wedges 34
cage 40
plurality of axially extending biasing prongs 42
additional prong 44

What is claimed is:

1. An outer ring assembly comprising:
   a first outer ring including a groove adapted to receive a plurality of locking wedges; and
   a second outer ring including an outer race adapted to support a plurality of rolling elements.

2. The outer ring assembly of claim 1, wherein the first outer ring and the second outer ring are fixed to each other.

3. The outer ring assembly of claim 1, wherein the first outer ring and the second outer ring are fixed to each other by a press fit or an axial interference fit.

4. The outer ring assembly of claim 1, wherein the groove of the first outer ring includes a tapered profile.

5. The outer ring assembly of claim 1, wherein a radial height of the first outer ring is identical to a radial height of the second outer ring.

6. A clutch bearing assembly including the outer ring assembly of claim 1, the clutch bearing assembly further comprising:
- an inner ring including an inner race adapted to support rolling elements, and a plurality of ramps axially spaced from the inner race;
- a cage including a plurality of axially extending biasing prongs;
- a plurality of locking wedges arranged radially between the groove of the first outer ring and the plurality of ramps, and each locking wedge of the plurality of locking wedges is arranged circumferentially between a respective pair of the plurality of axially extending biasing prongs; and
- a plurality of rolling elements supported between the inner race of the inner ring and the outer race of the second outer ring.

7. The clutch bearing assembly of claim 6, wherein the rolling elements are spherical ball bearings.

8. The clutch bearing assembly of claim 6, wherein the clutch bearing assembly is a one way clutch bearing.

9. The clutch bearing assembly of claim 6, wherein the inner ring is a unitary ring.

10. A method of assembling a one way clutch bearing assembly, the method comprising:
providing:
- a split outer ring assembly comprising a first outer ring including a groove adapted to receive a plurality of locking wedges, and a second outer ring including an outer race adapted to support a plurality of rolling elements;
- an inner ring including an inner race adapted to support rolling elements, and a plurality of ramps axially spaced from the inner race;
- a plurality of locking wedge positioned within the groove of the first outer ring; and
- a plurality of rolling elements positioned on the outer race of the second outer ring;

performing a first one of: (i) aligning the plurality of locking wedges with the plurality of ramps and inserting the inner ring inside the first outer ring supporting the plurality of locking wedges; or (ii) inserting the inner ring inside the second outer ring supporting the plurality of rolling elements; and performing a second one of: (i) aligning the plurality of locking wedges with the plurality of ramps and inserting the inner ring inside the first outer ring supporting the plurality of locking wedges; or (ii) inserting the inner ring inside the second outer ring supporting the plurality of rolling elements.

11. The method of claim 10, wherein an axis of the inner ring is offset from an axis of the second outer ring while inserting the inner ring inside the second outer ring.

12. The method of claim 10, wherein an axis of the inner ring is aligned with an axis of the first outer ring while inserting the inner ring inside the first outer ring.

13. The outer ring assembly of claim 1, wherein the first outer ring is thinner than the second outer ring.

* * * * *